INVENTORS
Robert R. Ferber,
Warren R. Smith and
Donald A. Trimmer
BY
William J. Ruano
their ATTORNEY

COMBINATION MOTION PICTURE AND TELEVISION CAMERA

Filed Dec. 11, 1963

5 Sheets-Sheet 2

INVENTORS
Robert R. Ferber,
Warren R. Smith and
Donald A. Trimmer
BY
William J. Ruano
their ATTORNEY Dec. 21, 1965 R. R. FERBER ETAL 3,225,140

COMBINATION MOTION PICTURE AND TELEVISION CAMERA

Filed Dec. 11, 1963 5 Sheets-Sheet 3

INVENTORS

Robert R. Ferber,
Warren R. Smith and
Donald A. Trimmer

BY William J. Ruano their ATTORNEY

INVENTORS
Robert R. Ferber,
Warren R. Smith and
Donald A. Trimmer
BY William J. Ruano
their ATTORNEY

COMBINATION MOTION PICTURE AND TELEVISION CAMERA

Filed Dec. 11, 1963 5 Sheets-Sheet 5

INVENTORS
Robert R. Ferber,
Warren R. Smith and
Donald A. Trimmer
BY
William J. Ruano
their ATTORNEY 3,225,140

COMBINATION MOTION PICTURE AND TELEVISION CAMERA

Robert R. Ferber, Pittsburgh, Pa., Warren R. Smith, Totowa, N.J., and Donald A. Trimmer, Bridgeville, Pa., assignors to Tele Cam Inc., Pittsburgh, Pa.

Filed Dec. 11, 1963, Ser. No. 329,632
13 Claims. (Cl. 178—7.8)

This invention relates to a combination motion picture and television camera and constitutes an improvement over the invention covered by U.S. Patent No. 2,960,565, dated Nov. 15, 1960. This camera provides a method of filming on 16 mm. motion picture film exactly the same image that is being televised by the attached television camera. Like the structure covered in Patent No. 2,960,565, the present invention uses a common lens system a 45° partially reflecting beam splitter behind the taking lens, and an optical image relay lens system to relay the image to a 16 mm. motion picture camera. The present invention, as that described in said patent, may be used with existing television cameras without major modification of the television camera.

There has been a need for many years in the motion picture field for a device that would allow 16 mm. motion picture producers the flexibility and speed of motion picture filming by the streamlined techniques used in television production, i.e. to be able to film a show continuously, instead of by tedious scene-by-scene shooting methods. Television producers have an equally great need for a device which allows them to make high quality motion picture films of television programs they originate in either black and white or color while they are being broadcast or taped for broadcast. Before the advent of video tape, the television broadcasting industry had an even greater need for such a system because of the lack of high quality television recording techniques for rebroadcast. The only system then available was kinescope recording for making a motion picture of the picture on a television program monitor. This system provided barely acceptable rebroadcasts at best and was limited to black and white reproduction. It was these problems of the motion picture and television industries that were partially solved by the development of the original combination motion picture-television camera described in Patent No. 2,960,565. This marked the first time that high quality black and white or color film copies of television programs became possible for either direct projection or rebroadcast.

With the advent of the 4½" image orthicon television camera, it became clear that entirely new designs were needed for these cameras.

It is accordingly an object of the present invention to provide a novel combination motion picture-television camera that will overcome inherent deficiencies and disadvantages of the structure shown in the above-mentioned patent.

A more specific object is to provide in a combination motion picture-television camera, an adjustable collimating lens system for image size adjustment and centering adjustment so as to match the film image with the television image.

Another object of the invention is to provide a structure enabling quick removal of the beam splitter and optical tube assembly for cleaning of the assembly and of the image orthicon, as well as to provide for quick removal of the motion picture camera to enable easier access to the television camera for maintenance purposes.

A further object of the invention is to provide a new rigid lens mount or turret suspension and focus drive suitable for zoom lens mounting as well as a new rigid optical system for providing better image quality by guaranteeing good optical alignment of the various elements.

Still another object of the invention is to provide for improvements of the optical path to reduce stray light or scatter and the resulting reduction of contrast, and instead, to increase the apparent film resolution. The position of the field lens has also been moved out of the plane of the image, thus practically eliminating visibility of lint or dirt on the field lens which would otherwise show in the film picture.

A still further object is to provide rapid iris adjustments of the film camera objective to compensate for lighting differences as the cameraman shifts from one scene to another.

A still further object of the invention is to provide subassemblies which can be removed without tools in a matter of a few minutes, such as the base plate with a tripod mount, a lens mount for a single lens or a multiple lens turret accommodating a plurality of lenses ranging from 50 mm. to greater than 8 inches; an optical tube housing; a relay lens system and beam splitter assembly; an adjustable collimator lens assembly; and a 16 mm. film camera ranging from a hand type spring wound camera of 100 ft. film capacity to synchronous electrically driven cameras of greater than 1200 ft. film capacity.

Other objects and advantages will become more apparent from a study of the following description taken with the accompanying drawings wherein.

Figure 1:
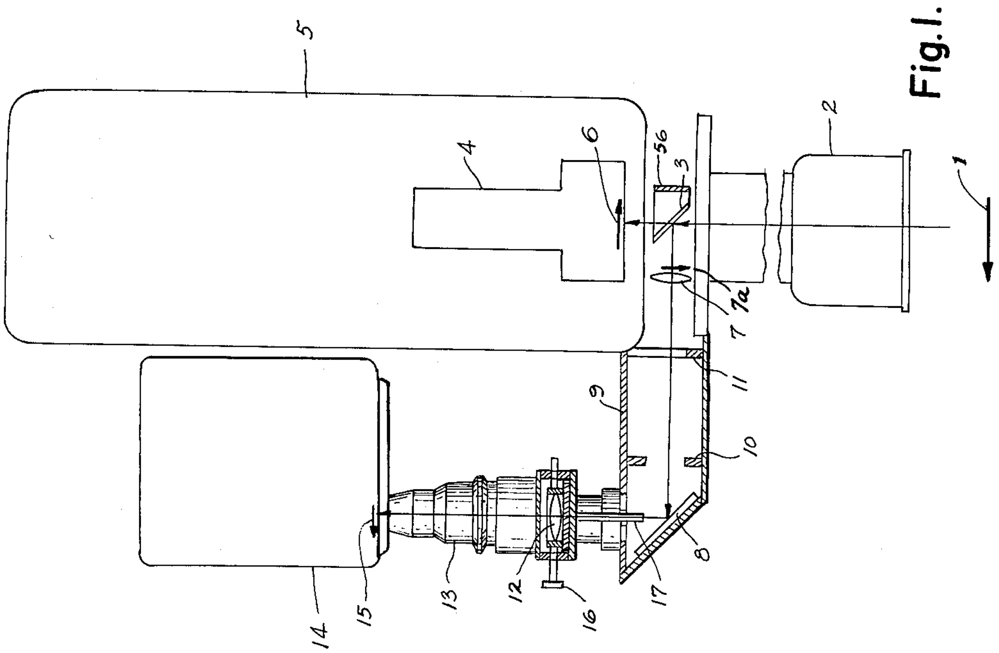
FIG. 1 is a top view, partly in horizontal cross-section, showing, somewhat schematically, a motion picture camera and television camera having a common optical lens system embodying the principles of the present invention.

Referring more particularly to FIG. 1 of the drawing which schematically illustrates the optical system of the combination motion picture and television camera embodying the present invention, numeral 1 denotes an arrow representing an object which is viewed through a main objective lens 2 (which may be a zoom lens). Numeral 3 denotes a beam splitter which is preferably a thin mirror of the order of .040 inch thick, to provide a rugged unit, or, instead, may be a thin film pellicle. The beam splitter is disposed at an angle of 45° to the incident light path and has the function of reflecting some of the light through the field lens 7 and passing through some of the light onto a television pick-up tube 4 of a television camera 5 to form an image 6 therein, as shown by arrows. Various light splitting ratios are available, up to 90% reflectance.

The reflected light beam is again reflected by a plane mirror 8 in an optical tube or housing 9 provided with baffles 10 and 11 to reduce scattering of the light along the walls of the tube. The reflected light beam passes through a collimator lens 12 which is adjustable horizontally by screw 16 (and which is adjustable also vertically as well as longitudinally), as will be described more fully hereinafter. After passing through the collimator lens 12, the light beam goes through the objective or relay lens 13 of the motion picture camera 14 so as to provide an image 15 on the film thereof, which image is only a fraction of the size of image 6. An important feature of the optical system is to form image 7a away from field lens 7, as shown, that is, longitudinally spaced from lens 7, so that dirt or lint particles on lens 7 will be far enough out of focus so as to be practically unnoticeable in image 15, since the field lens is no longer in an image plane. Therefore, the particles will not show up in the film picture.

A novel feature incorporated in the present invention is that of achieving easy access to several of the internal optical surfaces to permit cleaning, namely, the field lens 7, the beam splitting plate 3, and the front surface of the image orthicon 4. This is accomplished by placing the field lens and beam splitting device in one housing or bracket 48 (FIG. 5) that is secured to the main optical housing by two thumbscrew devices. To gain access for cleaning, the main objective lens and mount are slid forward to the furthest extremity of travel or removed from the camera, then the two thumbscrews 48a, are removed, and the beam splitter field lens housing 48 is removed. Once this housing is removed, sufficient room is provided to clean the beam splitter and field lens.

To gain access to the image orthicon for cleaning, thumbscrew 46 is removed and optical housing 9 is lifted from its combination mounting-alignment support 58. This procedure provides sufficient clearance for all normal purposes. Should further clearance be desired, screws 81a and 81b are removed, clevis pin 34 is detached, and lens mounting plate 30 is slid completely off bearing rods 32. Completely unobstructed access is now provided to the face of the image orthicon.

All parts removed are then assembled on the camera in a manner opposite to the manner in which they were removed. This assembly is greatly facilitated by the use of positive positioning mechanisms incorporated in the design of all components of the optical system that guarantees proper positioning of all of said components in order that no image shift is experienced in the motion picture camera relative to that image shown by the television camera, as will be more fully explained later.

Figure 2:
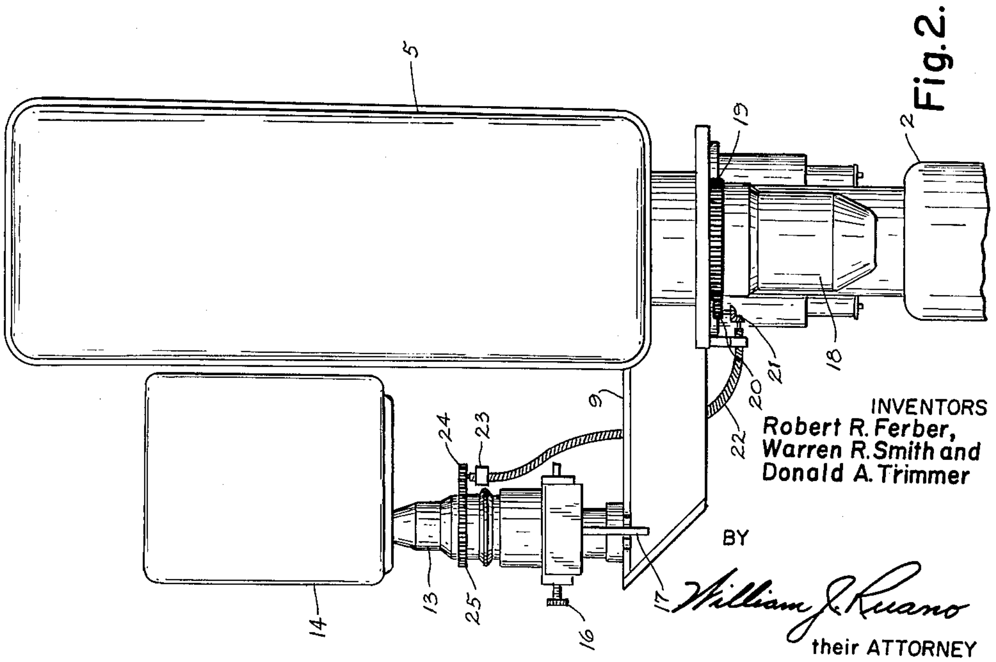
FIG. 2 is a top view, similar to FIG. 1, but showing the enclosures for the parts of FIG. 1, and additionally showing a flexible shaft for coupling the irises of the motion picture and television camera lenses.

Referring to FIG. 2, numeral 18 denotes an iris motor for opening and closing the iris of lens 2 and number 19 denotes an iris motor gear which drives a pinion 20, which, in turn, drives mitre gears 21, which rotate a flexible shaft 22 journaled in a fixed bearing 23 so as to drive a pinion 24 coupled to iris gear 25 of the motion picture camera 14. Thus, as the iris of the television camera is adjusted by electrical remote control by the operator to vary the size of the iris opening, in a well known manner, it will, by virtue of the mechanical coupling with the iris of the motion picture camera, correspondingly vary the size of the opening of such iris. Should it be necessary to change the initial relationship of the two irises, pinion 24 may be uncoupled from gear 25 by sliding its shaft within bearing 23, after which the desired ratio of iris settings is selected and then gear 24 is again coupled with gear 25 to enable simultaneous rotation of the respective iris gear motors by a single electrical control switch. It should be noted that instead of coupling the iris motors mechanically, such as by the flexible shaft shown, they may be coupled electrically, such as by selsyn motors, etc. in a well known manner.

Figure 3:
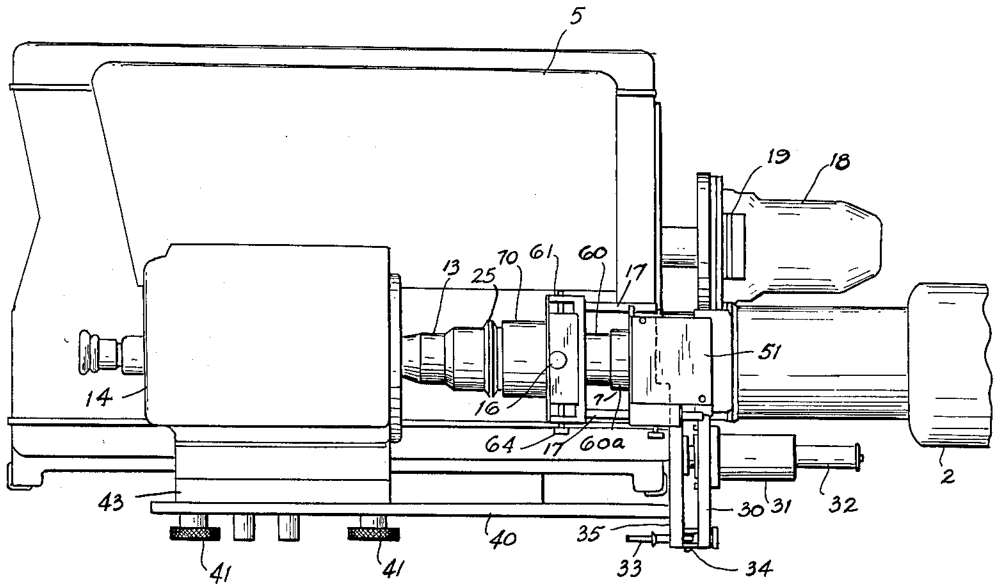
FIG. 3 is a side view and FIG. 4 is a front view, respectively, of the assembly shown in FIG. 2.
Figure 4:
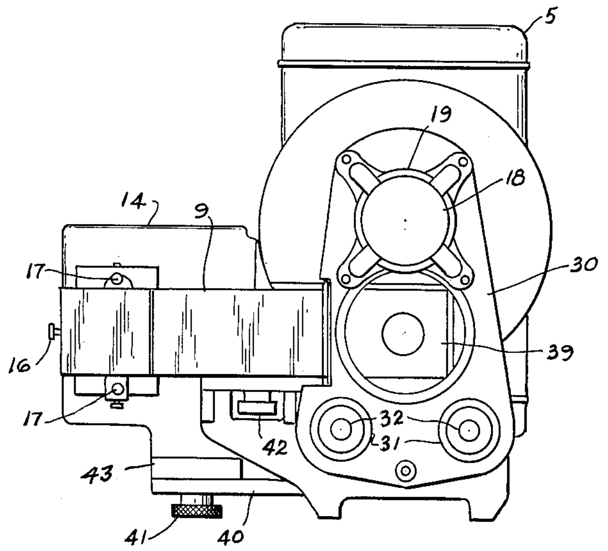
Figure 5:
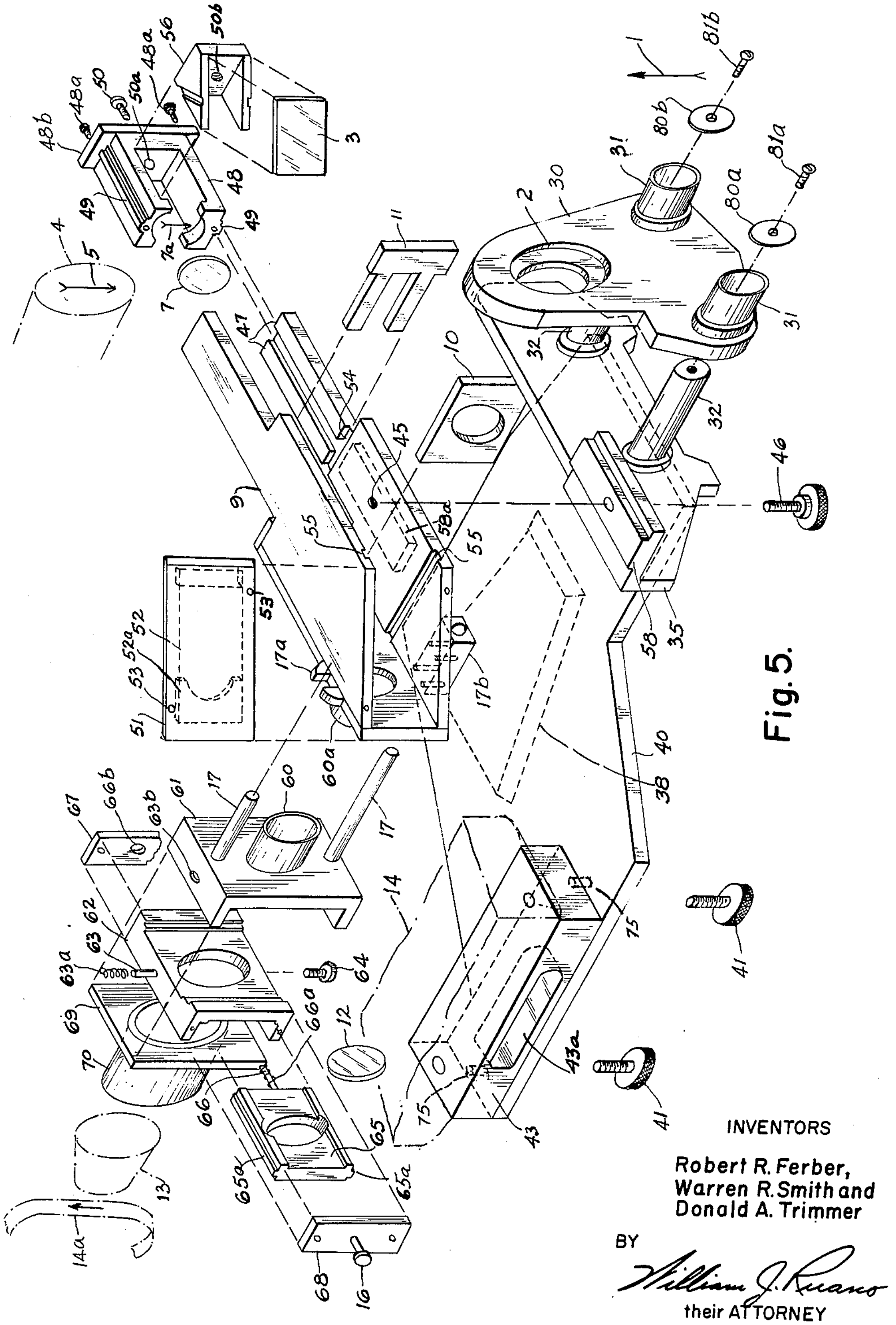
FIG. 5 is an exploded view of the parts forming the optical system in FIGS. 1 to 4 inclusive.

FIGS. 3, 4 and 5 show other mechanical parts of the assembly including an adjustable collimating lens system to permit adjustment of the size and position of the image presented to the motion picture camera. It includes two slide rods 17, rigidly secured to collimator housing 61, which serve as guides which are slidable through bearing 17a and pillow block 17b attached to the bottom of optical tube 9 for longitudinally adjusting the position of the collimator lens 12. At the same time, tubes 60 and 60a telescopically slide together to form a light shield of variable length.

A system of linear motion ball bearings 31, riding on precision ground rods 32 which are rigidly attached to the main camera frame, provides a lens mounting system that is free of deflection for the load applied to the turret, or other lens mounting system, by any common lens, including the heaviest zoom lenses. This system further insures that more than sufficient accuracy of optical alignment is maintained so that high ratio zoom lenses may be utilized in this system with no image shift throughout the zoom lens range. This system further provides a smooth, low friction linear motion of the lens and mount to permit the lens travel necessary for focussing under all conditions of operation.

FIG. 5 more clearly shows the lens mounting plate 30 for lens 2, which plate has integrally secured thereto linear ball bearing tubes 31 to permit free sliding movement on focus rods 32 attached to main mounting bracket or plate 35, which sliding movement is controlled by control rod 33. Plate 30 is held fastened in place by clevis pin 34, linking plate 30 with focus mechanism extension rod 82. The main mounting plate 35 is welded to the forward edge of a base plate 40. On top of plate 35 is integrally secured, such as by welding, a support 58 having an upstanding, rectangular shaped projection.

Much of the electronic circuitry of the television camera is located inside the right side door of the television camera and should be provided with ready access for maintenance. There was no provision for quick access in the previous device described in the aforesaid patent. The TV camera had to be removed from the camera system for maintenance, a very time consuming process since the system normally required complete optical realignment after reassembly. We have designed the present cameras so that the film camera unit is precisely located and positioned on the main baseplate and may be removed in a matter of seconds to allow unobstructed access to the right side of the TV camera. The film camera may then be remounted in its proper position to obtain proper optical alignment just as rapidly as it was removed.

As more clearly shown in FIG. 5, on base plate 40 there is detachably fastened, by means of fastening screws 41, motion picture camera mount 43 rigidly mounted on the motion picture camera. It is provided with a side slot 43a to accommodate the fingers when lifting. It is also provided with pins 75 fitting into corresponding holes in base plate 40 to provide quick and very accurate alignment during reinstallation of the motion picture camera 14 should it have been removed for gaining access to the right side of the television camera, or to the optical tube, or other parts of the optical system for cleaning, adjustment, or repairs.

The optical tube or housing 9 has a bottom screw hole 45 into which is screwed a screw 46 after a rectangular cut-out portion 58a on the bottom of the housing 9 (shown in dash lines) is mated or fitted onto the correspondingly shaped rectangular projection 58 mounted on the mounting plate 35.

Underneath the bottom of base plate 40 there is fastened a tripod mount adapter plate 38 which slides onto a correspondingly grooved portion on top of a tripod (not shown). Extreme rigidity and good optical axis alignment of all of the optical components of the system are necessary to assure minimum aberrations and tracking errors. We have provided an extremely solid optical system by use of a one piece welded optical tube assembly and mounting bracket 35. This bracket is positioned with respect to the base assembly and lens mount system by means of mating surfaces (58, 58a) machined true within 10 minutes of arc. This guarantees that the optical assembly axis and the main objective lens axis are coincident. Since all other portions of the optics, except for the final objective on the film camera are mounted in the optical tube assembly, they are all kept in proper alignment with each other and the main objective lens.

Into one end of the optical tube 9, there is slid a bracket 48 of somewhat U-shape provided with top and bottom rails 49 which slide into corresponding top and bottom grooves located between track portions 47 of the housing. Within bracket 48 is rigidly mounted a beam splitter holder or yoke 56 which is securely held in the bracket 48 by means of screw 50 extending through registering holes 50*a* and 50*b*, the latter being threaded. The beam splitter 3 is adhered or otherwise attached to one face of the beam splitter holder 56, as shown in dash lines. The field lens 7 is fitted between confronting arcuate portions of the legs or extremities of bracket 48 adjacent the position illustrated by image 7*a*. After bracket 48 is slid into tube 9, it is firmly held in place by screws 48*a* extending through holes of the cover plate 48*b* and into registering screw holes in the end of the tube 9 (not shown).

It is readily apparent that in contrast to the preceding design, in the event of disassembly of any or all of the components of the present system, rapid reassembly is insured by virtue of machining tolerances sufficient to guarantee precise alignment of all such components without the use of tools or gauges of any sort. Also, in contrast to the preceding design, such disassembly and reassembly can be accomplished by the technical personnel normally operating such equipment with only minimal training.

Another improvement over previous designs has been accomplished mainly by baffling of the optical tube area so that any stray light reflected from the interior walls cannot reach the final objective lens elements and the motion picture film. The apertures of all optical elements have also been reduced to the maximum aperture actually used by the image rays. The design of the optical housing has also been made in such shape, size and angles so as to further reduce internal scattering and reflections.

A baffle plate 10 is laterally slid into and welded to tube 9 along top and bottom grooves 55. Similarly, a U-shaped baffle plate 11 is slid into and welded to tube 9 along top and bottom grooves 54. To the angularly disposed end face of optical tube 9 is attached a closure plate 51 by screws extending through holes 53, onto the inner surface of which closure plate is mounted a mirror 52 by means of clamp 52*a*.

It has been found desirable to incorporate filters in the optical systems of the television and motion picture cameras. These filters are for the purpose of providing the correct amount of light or to provide monochromatic color correction or distortion to the image orthicon, also to provide for the capability of color correction to the film, as well as the more familiar uses of filters to provide either color correction or distortion when using black and white film.

Provision is made for insertion of filters at three locations, namely in front of the beam splitting device, behind the beam splitting device, and in front of the motion picture camera objective. This permits three degrees of control: (1) both cameras simultaneously, (2) television camera only, and, (3) film camera only. This feature provides for separate or simultaneous light control of the system as deemed necessary by the operator.

The present invention uses the same optical elements and number of components for all existing cameras, namely RCA TK–11, RCA TK–60, Marconi, General Electric, and others. Furthermore, it is designed to accommodate visual cue devices in the film camera to correspond to cue marks on video tape or kine film which is running simultaneously to aid in direct frame to frame editing from tape to film or film to tape.

Figure 6:
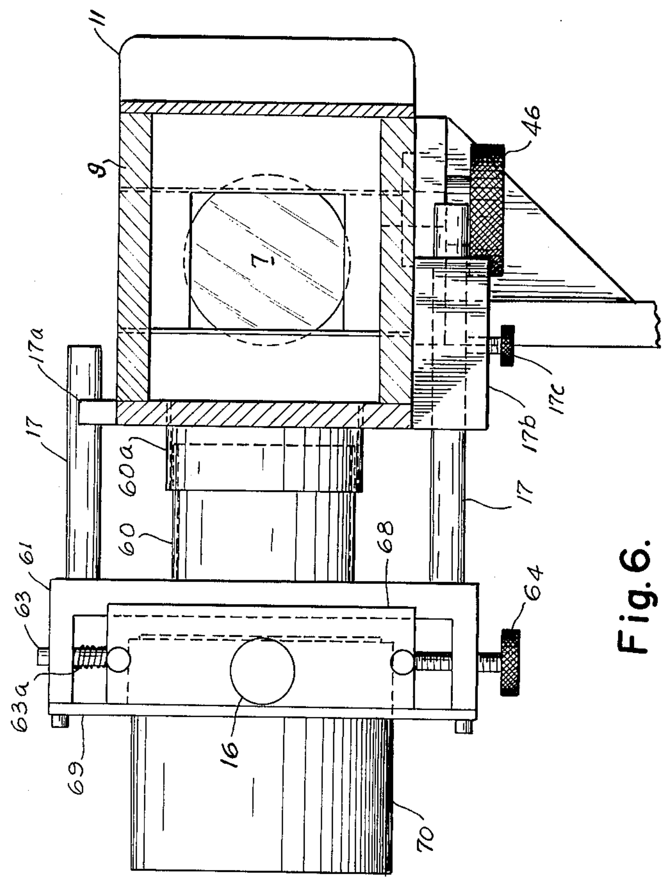
FIG. 6 is a side view and FIG. 7 is a rear view, respectively, of the adjustable collimator lens assembly shown in FIGS. 1 to 5 inclusive.
Figure 7:
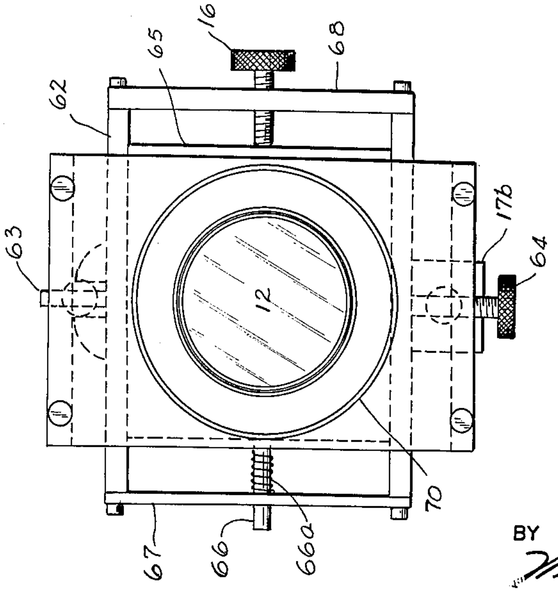

The adjustable collimator lens assembly is more clearly shown in FIGS. 5, 6 and 7. The collimator housing 61 has a hole 63*b* on top thereof through which extends a pin 63 surrounded by helical spring 63*a* so as to yieldably support a vertically slidable member 62 as it is adjusted vertically by vertical adjusting screw 64. The horizontally slidable member has top and bottom rails 65*a* slidable in corresponding grooves within member 62 and has integral pin 66 surrounded by spring 66*a* to enable it to be adjustable horizontally by turning of screw 16 against the action of spring 66*a* which abuts against the frame 67 (see FIG. 7) so as to adjustably drive pin 66 into hole 66*b* of cover plate 67. End cover plate 68 is provided as well as a rear cover plate 69 having integrally secured thereto a light shield 70, thereby effectively preventing stray light from entering the optical path between the collimator lens 12 and motion picture camera lens 13.

It will be readily seen that by longitudinal sliding of the collimator assembly along rods 17, longitudinal movement of the collimator lens 12 is provided, and that by horizontal sliding thereof by adjusting screw 16, horizontal adjustment is obtained, and that by vertical sliding thereof by turning of screw 64, vertical adjustment of the position of the collimator lens 12 is obtained, to permit adjustment of the size and position of the image presented to the motion picture camera.

The adjustment range provided is great enough to accommodate all likely size variances encountered in normal operating practice. If necessary, a collimator lens of other than normal focal length may be used in order to accomplish more radical changes.

In practice, all these adjustments are utilized as follows: The camera operator first makes all adjustments to the television camera to produce a picture of acceptable quality as defined by "good practice," including all those adjustments which vary the position and size of the scanned area of the image orthicon, such as vertical size, vertical linearity, vertical position, the similar adjustments in the horizontal aspect, and any other adjustments that may affect the scanned area. By then sighting through the motion picture camera by means of either integral sighting devices that operate through the lens, or by means of other easily available commercial devices that may be placed in the camera aperture, the collimator lens is then adjusted vertically, horizontally, and longitudinally as required in order that the motion picture camera will see identically that image observed in the television camera monitor. This adjustment procedure is greatly facilitated by the use of standard television test pattern, utilizing the edges of the pattern as reference points.

An additional feature of the system is that a suitable semi-transparent mask may be incorporated in the television camera, so that once the system is properly adjusted, the television camera will show the image that will be shown by a motion picture projector. This image is smaller than the image placed upon the film by the motion picture camera in accordance with American Standard Association Standard No. Z22.7–1950, location and size of picture aperture of 16 mm. motion picture cameras, and standard No. PH22.8–1957 projected image area of 16 mm. motion picture film, or latest revision thereof. Thus, all normal variances between the two images (motion picture and television) with respect to size and location may be quite easily removed.

In addition, the image presented to the motion picture camera is further adjustable in size so that, if desirable, the motion picture camera can cover a field of view adequate to compensate for the nominal 10% of the transmitted television field lost in the average home receiver by necessary picture tube overscanning and picture tube masks.

Figure 8:
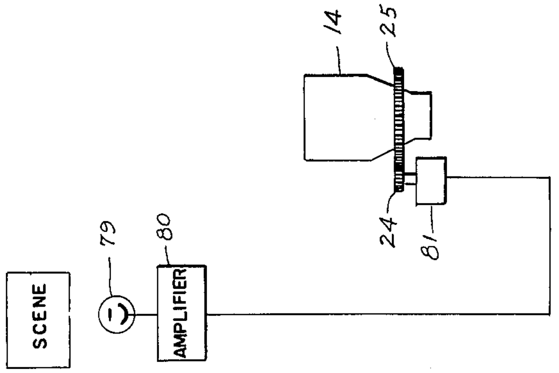
FIG. 8 is a schematic diagram showing a control means for the iris motors of the motion picture and television cameras.

FIG. 8 schematically shows a system for controlling an iris motor of the film camera 14. It has been found desirable under certain conditions to provide rapid iris adjustments of the film camera objective 13 to compensate for lighting differences as the cameraman shifts from one scene to another. Rapid control may be achieved by several methods, shown in FIGS. 8, 9 and 10, all of which are applicable to the present camera device. A servomotor 81 is geared by gears 24 and 25 (see FIG. 8) to the iris of the film camera 14. This motor may be controlled by any of several known, suitable systems. A photocell 79 or other light sensitive device may be coupled to the motor through a suitable electronic amplifier 80 so that the iris may be properly adjusted to accommodate the available light. This photocell or other device may be arranged to measure either average reflected light or it can be made as a probe device to measure either reflected light from small important areas, or incident light. In this mode of use, the probe would incorporate an on-off switch, thereby providing the system with a memory for the last probe reading.

Figure 9:
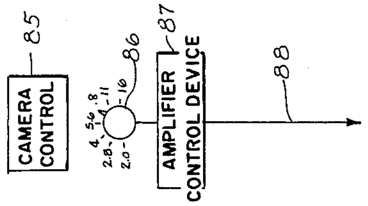
FIG. 9 is a modification of the control system shown in FIG. 8.

Alternatively, as shown in FIG. 9, a simple remote control knob or selector 86 can be incorporated at the camera control position 85 at all times under the control of the studio engineer at this position. He can either remotely adjust the motion picture camera iris by turning selector 86*a*, part of a device control amplifier 87, according to predetermined values measured after the lighting has been established, or using a predetermined sensitivity system, he may use his monitor waveform graticulate as an exposure meter and adjust the motion picture camera iris accordingly.

Figure 10:
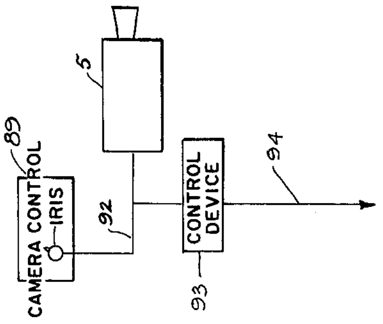
FIG. 10 is a further modification of the control system shown in FIG. 8.

Alternatively, as shown in FIG. 10, the motion picture camera iris may be coupled indirectly by wires 92 to the remote iris system 89 of the television camera 5, thereby providing a single control at the command of the studio engineer. In all instances, a suitable sensitivity control device 93 is incorporated in the motion picture camera iris amplifier in order to compensate for different film speeds and different beam-splitting device characteristics.

Thus it will be seen that we have provided a combination motion picture-television camera with a common optical system having significant improvements over that described in the aforesaid patent, including: an adjustable collimator lens sytem for image size adjustment and centering adjustment to match the film image with the television image; a construction permitting quick removal of the beam splitter and optical tube assembly for image orthicon cleaning and aligning and for quick removal of the film camera for television camera maintenance; a new turret suspension and focus drive suitable for zoom lens mounting; a new rigidly mounted optical system providing better image quality by assuring optical alignment of the various parts; improvement of the optical path to reduce stray light or fogging and positioning of the field lens so as to be out of the plane of the image to make dirt particles on the field lens unnoticeable; improvements in the beam splitter to make it more rugged; a novel synchronized electric iris control on the film camera; a unit comprising sub-assemblies which can be removed without tools in a matter of minutes; also an improved filter system and placements to enable various degrees of light and special effects masking or matting control.

While we have illustrated and described several embodiments of our invention, it will be understood that these are by way of illustration only, and that various changes and modifications may be made within the contemplation of our invention and within the scope of the following claims.

We claim:

1. In combination, a television camera having an image orthicon, a motion picture camera alongside said camera, an optical system common to both cameras and including a semi-transparent plate disposed at an angle relative to the optical path so as to transmit some of the light from an object to said image orthicon and the remainder of the light to said motion picture camera, said optical system including a collimating lens located in front of the objective lens of said camera, and means for adjustably sliding said collimating lens toward and away from said objective lens of the camera so as to enable matching of the motion picture film image with the television image size.

2. The combination recited in claim 1 together with means for adjustably moving said collimating lens either vertically or horizontally to enable centering of the image.

3. In combination, a base plate adapted to be mounted on a tripod, a motion picture camera having a base including registering means for accurately and detachably mounting said camera on said base plate, mounting means integrally secured to said base plate and including a registering element, a unitary optical tube housing having a second registering element adapted to mate with the first mentioned registering element to accurately position and detachably mount said housing on said base plate, said housing including a removable sidewall portion on which is mounted a reflecting mirror, said housing enclosing a slidably mounted and removable bracket on which is mounted a field lens and a semi-transparent plate, disposed angularly with respect, to said field lens, a television camera mounted on said base plate alongside said motion picture camera and including an image orthicon which confronts said semi-transparent plate so as to transmit some of the light thereto, the remainder of the light passing through said field lens and being reflected by said reflecting mirror onto a collimating lens exteriorly of said housing and confronting the objective lens of the motion picture camera.

4. The combination recited in claim 3 together with means for slidably mounting said collimating lens on said housing to enable adjustable movement toward and away from said objective lens of the motion picture camera to enable matching of the motion picture film image with the television image.

5. The combination recited in claim 4 wherein said means includes rod means slidable on bearing means integrally formed on said optical tube housing and includes means for laterally adjusting said collimating lens.

6. The combination recited in claim 4 wherein said mounting means comprises a bracket integrally mounted on the end of said base plate, rod means integrally formed on said bracket, and a lens mounting plate including bearing means slidable on said rod means.

7. In combination, a base plate adapted to be mounted on a tripod, a motion picture camera having a base including registering means for accurately and detachably mounting said camera on said base plate, mounting means integrally secured to said base plate and including a registering element, a unitary optical tube housing having a second registering element adapted to mate with the first mentioned registering element to accurately position and detachably mount said housing on said base plate, said housing including a removable sidewall portion on which is mounted a reflecting mirror, a substantially U-shaped bracket slidably and removably mounted in said housing, a field lens mounted between the extremities of said U-shaped bracket and a partially transparent plate removably mounted angularly between the legs of said bracket, and an end cover plate for said housing detachably mounted on said bracket, a television camera mounted on said base plate alongside said motion picture camera and arranged to receive the light passing through said partially transparent plate, a collimating lens confronting the objective lens of said motion picture camera and receiving light reflected by said mirror, adjustable mounting means for said collimating lens to provide slidable movement thereof towards or away from said objective lens of the motion picture camera and to provide vertical or sidewise movement of said collimating lens to permit image size adjustment and centering adjustment so as to match the motion picture film image with the television camera image.

8. The combination recited in claim 7 wherein said adjustable mounting means includes a pair of rods slidably mounted in bearings formed integrally on said housing, and includes telescoping tubes, one on said mounting means and the other on said housing to permit longitudinal movement of said collimating lens along the light path while preventing entry of outside light.

9. The combination recited in claim 7 wherein said mounting means comprises a bracket integrally secured to the end of said base plate, a pair of rods integrally secured to said last mentioned bracket and extending away from and parallel to said base plate, and a lens carrying mounting plate including tubular bearings slidably mounted on said rods to enable adjustment of the portion of the lens carried by said mounting plate.

10. In combination, a television camera having an image orthicon, a motion picture camera alongside said camera, an optical system common to both cameras and including a semi-transparent plate disposed at an angle relative to the optical path so as to transmit some of the light from an object to said image orthicon and the remainder of the light to said motion picture camera, said optical system including a collimating lens located in front of the objective lens of said camera, and means for adjustably sliding said collimating lens toward and away from said objective lens of the camera so as to enable matching of the motion picture film image with the television image, said motion picture camera having an iris and an iris operating motor, and electrical control means responsive to light of the scene being shot to control said motor.

11. In combination, a television camera having an image orthicon, a motion picture camera alongside said camera, an optical system common to both cameras and including a semi-transparent plate disposed at an angle relative to the optical path so as to transmit some of the light from an object to said image orthicon and the remainder of the light to said motion picture camera, said optical system including a collimating lens located in front of the objective lens of said camera, and means for adjustably sliding said collimating lens toward and away from said objective lens of the camera so as to enable matching of the motion picture film image with the television image, said television and motion picture cameras each including an iris, a motor for operating one of said irises, and means for coupling said irises together so that they are operated simultaneously by said motor.

12. The combination recited in claim 11 together with light responsive means located at the scene for operating said motor.

13. The combination recited in claim 11 together with remote electrical control means for controlling the amount of rotation of said motor.

No references cited.

DAVID G. REDINBAUGH, *Primary Examiner.*

J. A. ORSINO, *Assistant Examiner.*